(12) United States Patent
Wakeman et al.

(10) Patent No.: US 7,137,381 B1
(45) Date of Patent: Nov. 21, 2006

(54) INDIRECT VARIABLE VALVE ACTUATION FOR AN INTERNAL COMBUSTION ENGINE

(75) Inventors: Russell J. Wakeman, Canton, MI (US); Frédéric F. Jacquelin, Canton, MI (US)

(73) Assignee: Ricardo, Inc., Van Buren Twp., MI (US)

( * ) Notice: Subject to any disclaimer, the term of this patent is extended or adjusted under 35 U.S.C. 154(b) by 0 days.

(21) Appl. No.: 11/105,144

(22) Filed: Apr. 13, 2005

(51) Int. Cl.
*F02D 11/10* (2006.01)
*G01M 19/00* (2006.01)

(52) U.S. Cl. .................. 123/399; 123/90.15; 60/292

(58) Field of Classification Search ............. 123/399, 123/302, 306, 308, 336, 432, 184.56, 184.57, 123/90.11, 90.15, 90.16, 568.11, 568.14; 60/292
See application file for complete search history.

(56) References Cited

U.S. PATENT DOCUMENTS

| | | | |
|---|---|---|---|
| 1,307,185 A * | 6/1919 | Claudel .................. 123/336 |
| 3,577,727 A * | 5/1971 | Warren et al. ............. 60/292 |
| 4,513,699 A | 4/1985 | Cser |
| 4,771,740 A | 9/1988 | Koike |
| 4,858,569 A | 8/1989 | Cser et al. |
| 4,889,082 A | 12/1989 | Hitomi et al. |
| 4,919,087 A | 4/1990 | Ogami et al. |
| 5,009,200 A | 4/1991 | van Basshuysen et al. |
| 5,012,771 A | 5/1991 | Oda et al. |
| 5,085,178 A | 2/1992 | Hitomi et al. |
| 5,123,383 A | 6/1992 | Fukada et al. |
| 5,125,369 A | 6/1992 | Hitomi et al. |
| 5,156,116 A | 10/1992 | Schrenberg |
| 5,178,104 A | 1/1993 | Ito et al. |
| 5,186,126 A | 2/1993 | Tarekado et al. |
| 5,255,638 A * | 10/1993 | Sasaki et al. .......... 123/184.57 |
| 5,322,038 A | 6/1994 | Urabe et al. |
| 5,433,073 A | 7/1995 | Duret et al. |
| 5,502,963 A | 4/1996 | Inaba |
| 5,660,152 A | 8/1997 | Masuda |
| 5,704,326 A | 1/1998 | Minegishi et al. |
| 5,755,191 A | 5/1998 | Kottmann |
| 5,765,525 A * | 6/1998 | Ma .......................... 123/308 |
| 5,787,858 A | 8/1998 | Meneely |
| 5,813,380 A | 9/1998 | Takahashi et al. |
| 5,934,072 A * | 8/1999 | Hirota et al. ............. 60/301 |
| 5,934,246 A * | 8/1999 | Sato ........................ 123/308 |
| 6,003,303 A | 12/1999 | Peter-Hoblyn et al. |

(Continued)

FOREIGN PATENT DOCUMENTS

| JP | 61135915 | 1/1986 |
|---|---|---|
| JP | 2305308 | 3/1990 |
| JP | 2078731 | 12/1990 |

*Primary Examiner*—Hai Huynh
(74) *Attorney, Agent, or Firm*—Butzel Long

(57) ABSTRACT

A reciprocating piston-type internal combustion engine includes an engine cylinder, an intake port, an intake runner providing a passage through which intake gas enters the cylinder through the intake port, an intake valve for opening and closing the intake port, and a first flap located in the intake runner upstream from the intake valve, arranged in series with the intake valve, and having first and second positional states that vary during each engine cycle. The first state opens the intake runner passage to permit intake gas to enter the cylinder through the intake port. The second state at least partially closes the intake runner passage to control the flow of gas exiting or entering the cylinder through the intake port.

22 Claims, 8 Drawing Sheets

U.S. PATENT DOCUMENTS

| | | |
|---|---|---|
| 6,032,634 A | 3/2000 | Minegishi et al. |
| 6,073,600 A | 6/2000 | Ma |
| 6,135,088 A | 10/2000 | Duret |
| 6,158,215 A | 12/2000 | Bosch et al. |
| 6,250,272 B1 * | 6/2001 | Rutschmann et al. .. 123/184.57 |
| 6,311,653 B1 * | 11/2001 | Hamamoto ............. 123/90.11 |
| 6,338,246 B1 | 1/2002 | Eguchi et al. |
| RE37,631 E | 4/2002 | Nanami et al. |
| 6,443,114 B1 | 9/2002 | Minegishi et al. |
| 6,450,141 B1 | 9/2002 | Sakuma |
| 6,484,495 B1 * | 11/2002 | Minami ................. 60/288 |
| 6,553,959 B1 * | 4/2003 | Xu et al. ................ 123/295 |
| 6,568,359 B1 | 5/2003 | Pischinger et al. |
| 6,598,575 B1 | 7/2003 | Minegishi et al. |
| 6,668,548 B1 * | 12/2003 | Asanuma et al. ........... 60/286 |
| 6,675,579 B1 * | 1/2004 | Yang ..................... 60/599 |
| 6,708,680 B1 * | 3/2004 | Lavy et al. .............. 123/586 |
| 6,886,533 B1 * | 5/2005 | Leiby et al. ............. 123/432 |
| 6,923,149 B1 * | 8/2005 | Nishimoto et al. ....... 123/58.8 |
| 6,941,905 B1 * | 9/2005 | Hitomi et al. .......... 123/58.8 |
| 6,945,236 B1 * | 9/2005 | Nakai et al. .......... 123/568.12 |
| 2001/0020454 A1 | 9/2001 | Kobayashi |
| 2001/0032600 A1 | 10/2001 | Minegishi et al. |
| 2002/0088423 A1 | 7/2002 | Minegishi et al. |
| 2002/0117138 A1 | 8/2002 | Katayama |
| 2003/0019472 A1 * | 1/2003 | Konno ................ 123/339.24 |
| 2003/0037737 A1 | 2/2003 | Artola |
| 2003/0041822 A1 | 3/2003 | Pischinger et al. |
| 2003/0094164 A1 | 5/2003 | Lowl, Jr. et al. |
| 2005/0183693 A1 * | 8/2005 | Yang et al. ............. 123/305 |

* cited by examiner

INDIRECT VARIABLE VALVE ACTUATION FOR AN INTERNAL COMBUSTION ENGINE

BACKGROUND OF THE INVENTION

The present invention relates generally to a variable intake control system for an internal combustion (IC) engine. More particularly, it pertains to an intake system that employs cycle-by-cycle control of airflow and compressible fluid resonance techniques to efficiently use or enhance intake gas pressure pulses when charging the cylinders.

Camless variable valve actuation systems have been developed to control engine intake valves and exhaust valves using electrohydraulic and electromagnetic technology rather than conventional mechanical camshafts to provide variability in the charging process that cannot be obtained with fixed camshaft actuation of the engine valves. But these camless valve actuation systems are costly and complicated.

Various techniques are used to improve the intake gas supply of reciprocating piston-type internal combustion engines. For example, U.S. Pat. No. 4,513,699 describes an intake gas resonance system associated with a group of engine cylinders whose suction strokes do not significantly overlap. The system includes a resonator communicating with intake openings of the cylinders. The system further has a resonance tube communicating with the resonator. The resonance tube has a length portion terminating at the resonator vessel and having cross-sectional areas increasing towards the resonator vessel. The cross-sectional area taken at the end of the resonance tube where it joins the resonator vessel is at least 1.2 times greater than the minimum cross section of the resonance tube. The distance between the end of the resonance tube joining the resonator vessel and an oppositely located inner wall face of the resonator vessel is greater than the diameter of a circle whose area equals the cross-sectional area taken at that end of the resonance tube.

There is need for a simple, low cost technique to improve engine intake gas charging control, in which intake and exhaust valves are controlled by single or double lobed camshafts, preferably camshafts designed to produce the longest valve open periods that are required anywhere in the engine operating map. Such cam timing features are best suited for optimal high speed, high power engine operation, and are accomplished with fixed cam timing. However, these long opening periods will be detrimental during other modes of engine operation, at lower speeds and loads, and thus require additional controls to provide variability which produces optimal performance at all points in the operating map.

There is a further need also to enhance exhaust gas recirculation (EGR) into an IC engine using conventional structural components and simple electronic control strategies. Additionally, a two stroke IC engine having no engine intake or exhaust valves would be controlled during each engine cycle to prevent back flow of engine exhaust gas from the exhaust runner into the combustion cylinder.

It is desirable, therefore, to provide means for improving the air handling capabilities of a naturally aspirated engine using inexpensive components that do not require extensive modification to the valve train system of the engine.

SUMMARY OF THE INVENTION

An engine system, according to this invention, provides the advantage of a simple, low-cost indirect variable valve actuation that allows for a large number of engine cycle-valve timing combinations for both full-load and partial-load performance. The engine reduces fuel consumption, improves volumetric efficiency, and improves engine emissions on a comparable basis with other engine induction systems. The system consists of flaps installed in series with conventional engine valves such that the flaps can control flow into or out of the cylinder during the period when the optimally profiled engine valve is allowing flow. This relieves the variable valve actuation device of the difficult task of sealing and enduring engine combustion temperatures and pressure, but still allows control of engine flows by the engine management system.

The engine intake flaps are controlled readily using relatively simple control logic and at low system cost compared to camless and variable valve actuation systems that accomplish similar functions. For pulse charging application of turbo-charged engines, this system can be used to reduce pumping losses compared to known resonance gas systems, and to improve engine air charging performance further.

A reciprocating piston-type internal combustion engine, according to this invention, includes an engine cylinder including an intake port, an intake runner providing a passage through which intake gas enters the cylinder through the intake port, an intake valve for opening and closing the intake port, and a first flap located in the intake runner upstream from the intake valve, arranged in series with the intake valve, and having first and second positional states that vary during each engine cycle. The first state opens the intake runner passage to permit intake gas to enter the intake port. The second state at least partially closes the intake runner passage to control the air flow and vary the effective timing of the intake gas through the intake port. Similar operations can be set up to control the exhaust flow during overlap, during the secondary events when using dual lobes cam shafts, and/or during the exhaust stokes.

For turbo-charged engines, intake resonance can be used in combination with the flaps to improve engine air charging by coordinating the operation of the flaps with that of the engine intake valves to trap intake air pressure pulses in the cylinder and preventing them from flowing from the cylinder back into a resonator. Such an engine system includes multiple engine cylinders having first and second intake ports, first intake runners providing passages through which intake gas enters the first intake port of each respective cylinder, and second intake runners providing passages through which intake gas enters the second intake port of each respective cylinder. Each cylinder includes first intake valves for opening and closing the first intake port of each respective cylinder, and second intake valves for opening and closing the second intake port of each respective cylinder. A plenum containing intake gas communicates with a first resonator connected to the first outlet and the first intake runner of each respective cylinder for producing in the first intake runner first pressure pulses of intake gas having a varying cyclic amplitude. The plenum also communicates with a second resonator connected to the second outlet and with the second intake runner of each respective cylinder for producing in the second intake runner second pressure pulses of intake gas having a varying cyclic amplitude that is out of phase with the first cyclic pressure pulses. Flaps, located in a first intake runner upstream from, and in series with a respective first intake valve, have first and second positional states that vary during each engine cycle. The first state opens the first intake runner passage to permit the pressure pulses to enter the cylinder through the intake port. The second state at least partially closes the first intake runner passage to limit or prevent intake gas from exiting the cylinder through the intake port.

DESCRIPTION OF THE DRAWING

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 9:
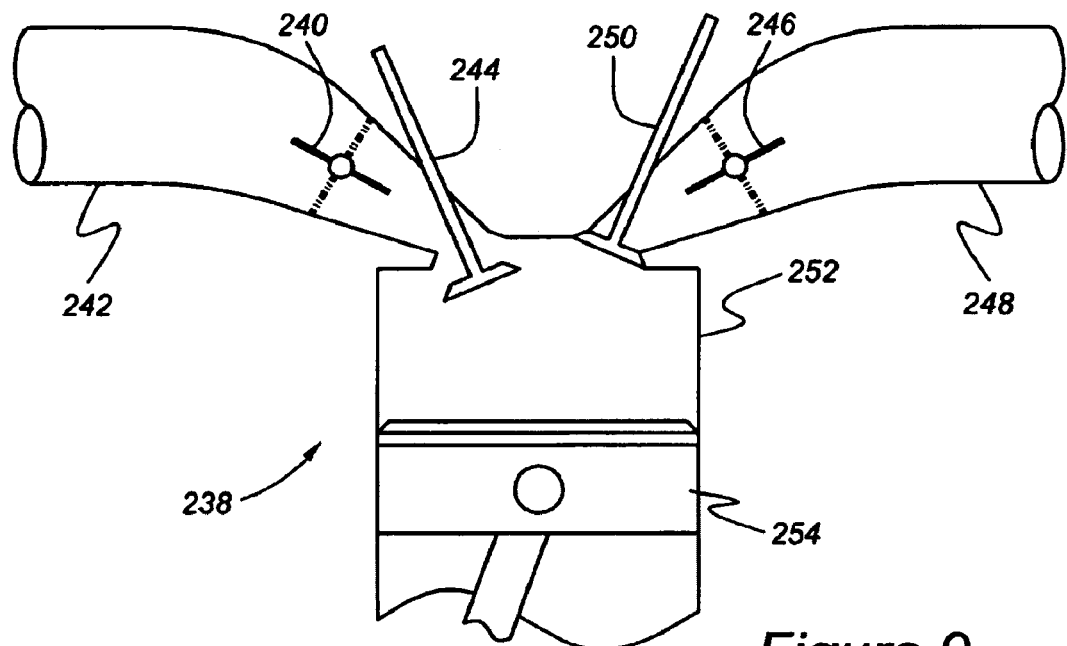
FIG. 9 is a schematic diagram of an alternate embodiment of an intake and exhaust system for an internal combustion engine.
Figure 10:
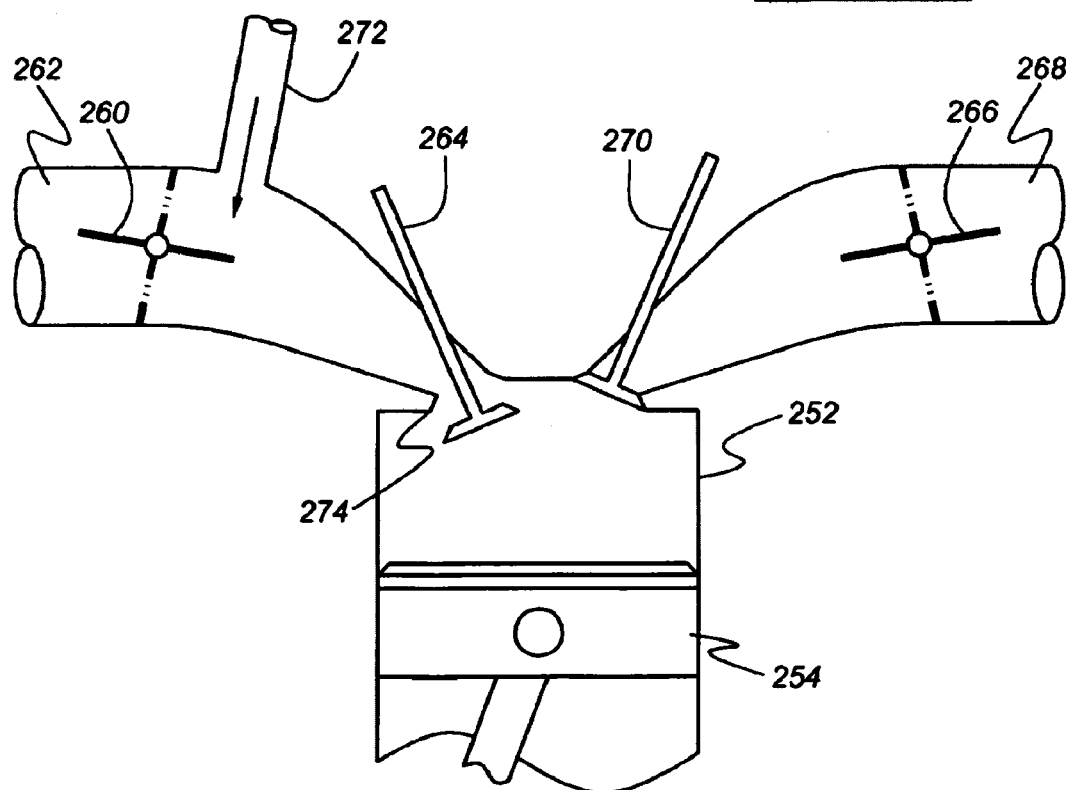
FIG. 10 is a schematic diagram of an intake gas system, to which the present invention is applied, for an IC engine having an EGR source.
Figure 11:
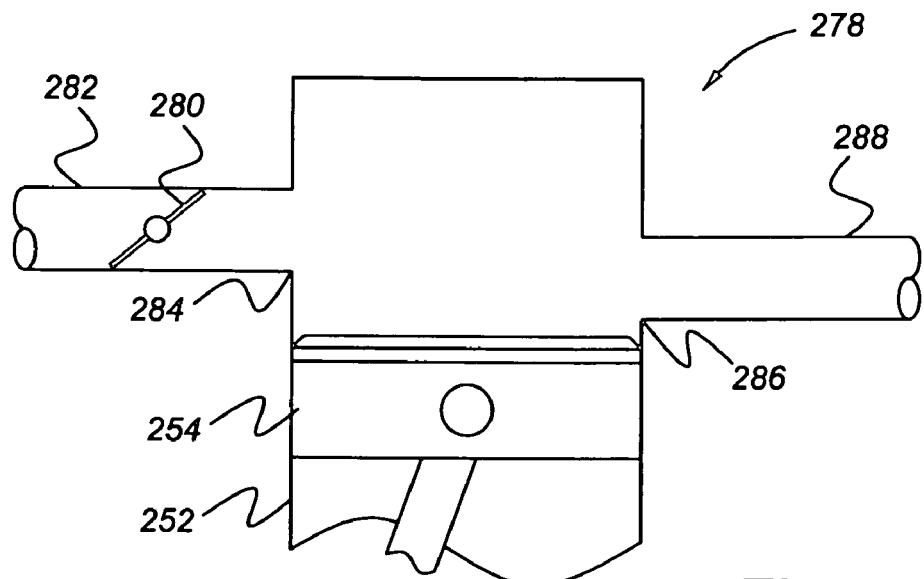
FIG. 11 is a schematic diagram of an intake and exhaust gas system for a two-stroke IC engine to which the present invention is applied.

Although each cylinder of the engine described with reference in FIG. 1 has two intake ports and two exhaust ports, this invention can be applied to an engine having one intake port and one exhaust port per cylinder. For example, FIGS. 9, 10 and 11 illustrate the invention applied to engines having one intake port and one exhaust port. The engine described next with reference to FIG. 2 is another example of this invention applied to an engine having one intake port and one exhaust port per cylinder.

Figure 1:
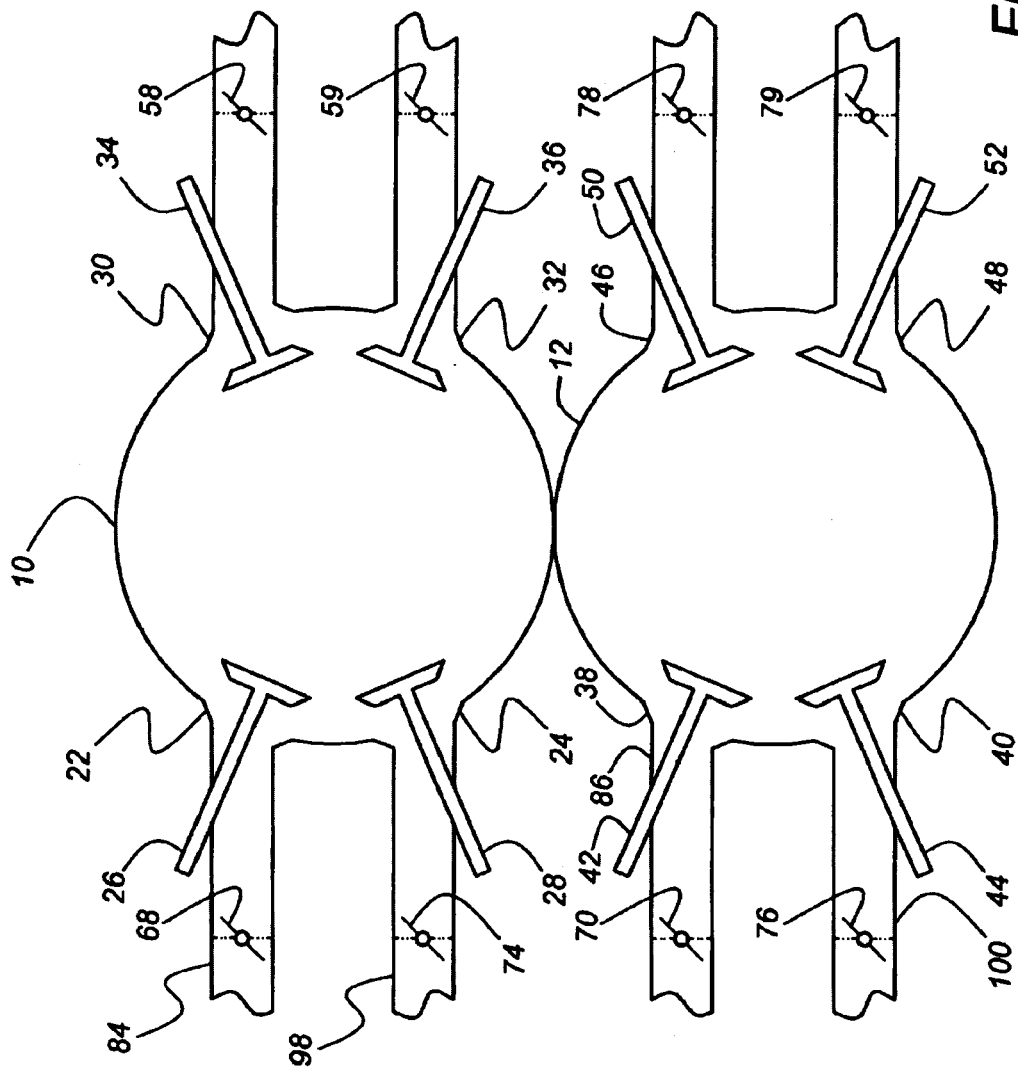
FIG. 1 is a schematic diagram showing an intake and exhaust gas system for an IC engine, to which the present invention can be applied.
Figure 2:
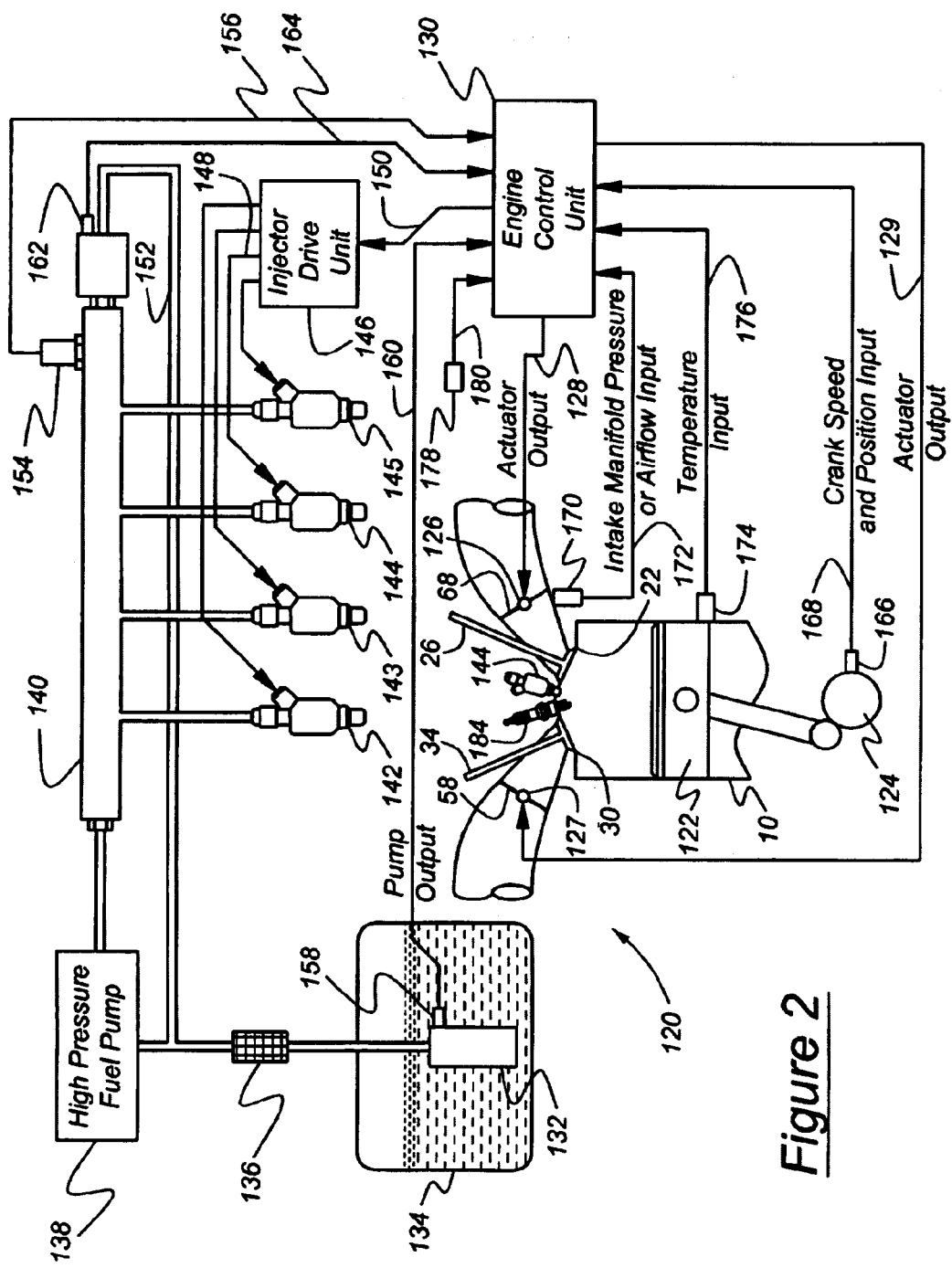
FIG. 2 is a schematic diagram of an IC engine control system incorporating intake and exhaust flaps.

In FIG. 1 there is illustrated cylinder 10, 12 of an internal combustion engine, each cylinder containing a reciprocating piston (not shown) connected to a crankshaft. Each cylinder has two intake ports and two outlet ports. For example, cylinder 10 has intake ports 22, 24, which are opened and closed by intake valves 26, 28, respectively, and two outlet ports 30, 32, which are opened and closed by exhaust valves 34, 36, respectively. Camshafts to produce the conventional intake, compression, power and exhaust strokes in each cylinder actuate the intake valves 26, 28 and exhaust valves 34, 36. Similarly, cylinder 12 has intake ports 38, 40, which are opened and closed by intake valves 42, 44, respectively, and two outlet ports 46, 48, which are opened and closed by exhaust valves 50, 52, respectively.

An intake flap or butterfly valve, located in an intake passage in series with at least one of the intake valves of each cylinder, is supported to pivot about an axis transverse to the axis of the intake passage. For example, intake flap 68 is arranged in series with intake valve 26, intake flap 70 is arranged in series with intake valve 42, intake flap 74 is arranged in series with intake valve 28, and intake flap 76 is arranged in series with intake valve 44.

Each exhaust port 30, 32, 46, 48 communicates with the exhaust system of the vehicle. Exhaust flap 58 is arranged in series with exhaust valve 34, exhaust flap 59 is arranged in series with exhaust valve 36, exhaust flap 78 is arranged in series with exhaust valve 50, and exhaust flap 79 is arranged in series with exhaust valve 52.

In operation, the engine intake valves 26, 28, 42, 44 operate under control of the cam shaft for each engine cylinder 10, 12 in the conventional way, opening at the beginning of the intake stroke, closing at the beginning of the compression stroke, remaining closed during the expansion stroke, and opening at the beginning of the exhaust stroke. The intake flaps 68, 70, 74, 76 are controlled so that each flap opens and closes at the appropriate time for each cylinder, whose cycles are out of phase with the cycles of the other cylinders. The intake flaps 68, 70, 74, 76 are controlled to alternately open and close the corresponding intake passages during each engine cycle for each engine cylinder 10, 12. Each flap then closes, before the intake valve of the corresponding cylinder closes, to prevent backward flow of intake gas from the cylinders through the intake ports and intake passages to a resonator (not shown). When the intake valves of each cylinder close, the charge is compressed, ignited and expands in the cylinder. Engine exhaust gas exits the cylinders during the exhaust stroke of each cylinder through exhaust ports 30, 32, 46, 48.

Although the system 120 illustrated in FIG. 2 is described with reference to the control of representative flaps, viz. intake flap 68 exhaust flap 58 of a four-stoke spark ignition gasoline engine, the system can be used to control the flaps of four-stroke and two-stroke gasoline and diesel engines. The system is shown operatively applied to cylinder 10, in which a reciprocating piston 122 drives the engine crankshaft 124. The flaps 58, 68 are opened and closed by actuators 126, 127, whose positional and functional state are changed by corresponding actuator drivers in response to actuator signals 128, 129 produced as output by an engine control unit (ECU) 130. Suitable actuator drivers may be selected from the following candidates: a torque motor, stepper motor, rotary oscillator, hydraulic motor, or other such devices. Preferably, the ECU is an electronic controller, such as a microprocessor having a CPU accessible to electronic memory.

The system 120 includes a fuel delivery subsystem, which includes a low pressure fuel pump 132, located in a fuel tank 134, for pumping fuel through a fuel filter 136 to the inlet of a high pressure fuel pump 138. Fuel is carried from the outlet of pump 138 in a fuel rail 140 to fuel injectors 142–145, each injector metering a quantity of fuel that is injected into a respective cylinder 10, 12, 14. A fuel injector drive unit 146 actuates the injectors alternately in a time sequence related to demands of the vehicle operator and other variables. The fuel injector drive unit 146 produces injector actuation signals 148 to the respective injectors in response to an electronic control signal 150 produced as output by the ECU 130. Fuel is returned from fuel rail 140 to the inlet of pump 138 through a fuel line 152.

The ECU is supplied continuously with sampled input data produced by sensors, which produce electronic signals representing the magnitude of various system parameters. Pressure sensor 154 produces a signal 156 representing the magnitude of pressure in fuel rail 140. Sensor 158 produces a signal 160 representing the flow rate of fuel from pump 132. Sensor 162 produces a signal 164 representing the flow rate of fuel in return line 152. Sensor 166 produces a signal 168 representing the speed and crank angle position of crankshaft 124. Sensor 170 produces a signal 172 representing intake manifold pressure or mass airflow rate, which are measures of engine load. Sensor 174 produces a signal 176 representing cylinder temperature. Sensor 178 produces a signal 180 representing throttle angle.

A control algorithm produces from these input data and a control algorithm the output control signal 128 to actuator driver, which synchronizes motion of the flap 68 with engine events in real time. The control algorithm uses engine speed, a measure of engine load (airflow or manifold pressure), engine temperature, throttle angle, and other inputs and determines the correct flap position and flap timing for the current operating condition from a multidimensional lookup table defined by calibrating the engine. On the basis of engine control algorithms executed by the ECU 130, control signal 128 is produced as output with reference to the commanded flap position determined from the lookup table, and an ignition signal is supplied with appropriate timing to a spark plug 184 or glow plug, when the engine requires spark ignition. However, flap control of this invention can be applied also to a diesel engine or another engine type in which compression ignition occurs.

Figure 3:
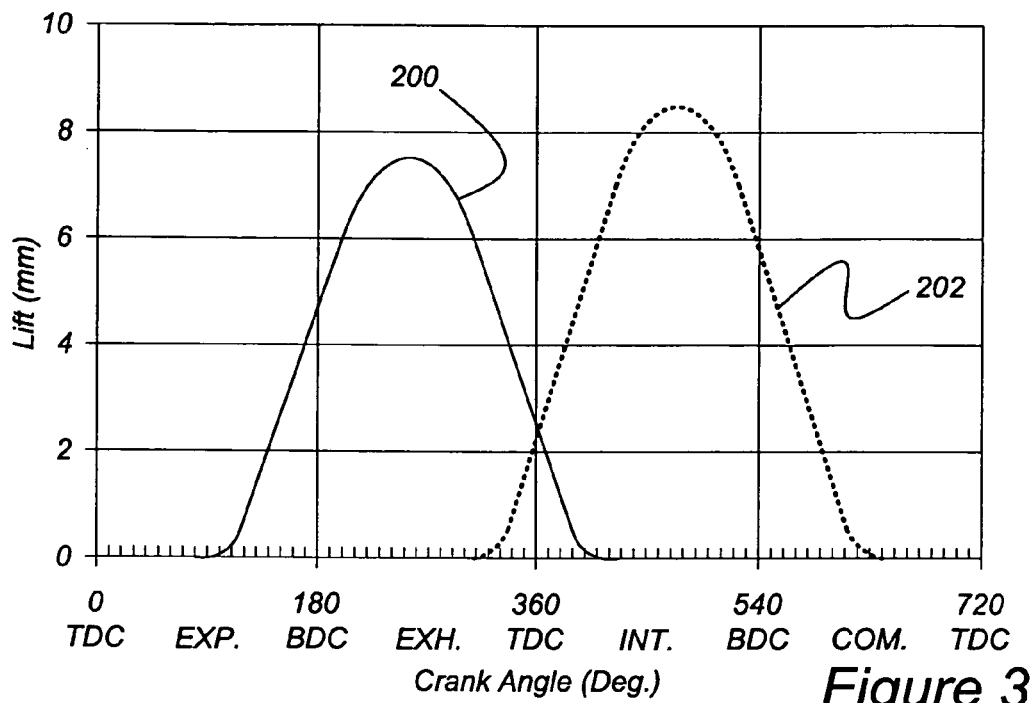
FIGS. 3–6 illustrate the variation of engine valve lift vs. crank angle over a range of engine speed, load, and EGR requirement.

FIGS. 3–7 illustrate the operation of the flap in various ranges of speed, load, and EGR requirement during the expansion, exhaust, intake and compression strokes, shown, respectively, from left to right. FIG. 3, shows exhaust valve 34 displacements 200 and intake valve 26 displacements 202, with the engine under full load, at high speed, and with the flap 68 opened continually.

Figure 4:
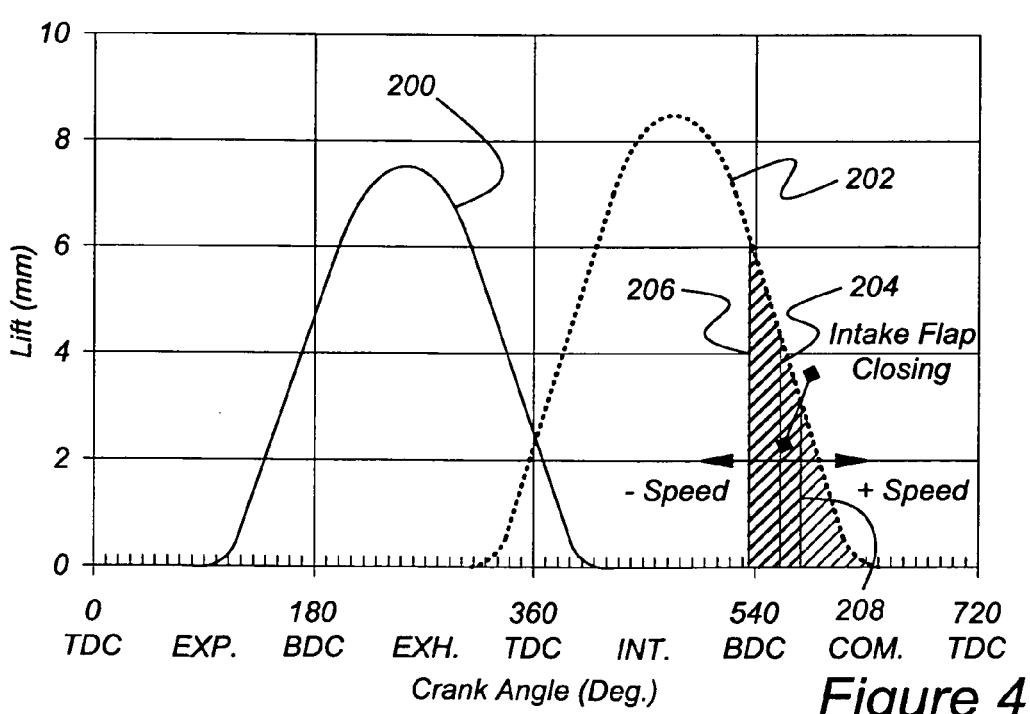

FIG. 4 shows exhaust valve 34 and intake valve 26 displacements 200, 202, respectively, with the engine under full load, at lower speed than that of FIG. 3, and with the flap 68 actuated for ram effect, effective compression ratio and back flow management. Intake flap 68 begins closing at 204, fully closes, and remains closed until the intake valve closes at 206. Then the flap 68 opens. Closure of flap 68 begins earlier at 206, when engine speed is lower. Flap closure begins later at 208, when engine speed is higher.

Figure 5:
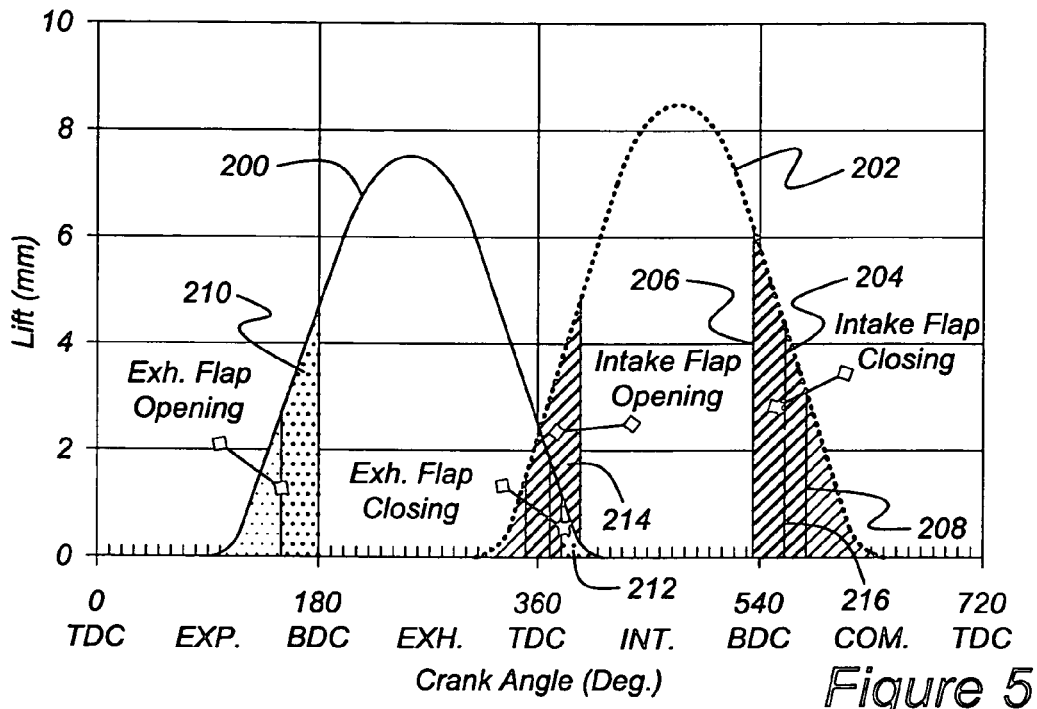

FIG. 5 shows the flaps 68, 58 opening and closing, and the opening and closing displacements 200, 202 of the exhaust valve 34 and intake valve 26, respectively, with the engine under full and part load, the flaps 58, 68 inducing a phasing effect for optimized engine performance including pumping work and internal EGR induction. Exhaust flap 58 opens during the crank angle range 210 while exhaust valve 34 is opening, and flap 58 closes during the crank angle range 212 while exhaust valve 34 is closing. Intake flap 68 opens during the crank angle range 214 while intake valve 26 is opening, and intake flap 68 closes during the crank angle range 216 while the intake valve 26 is closing. Intake flap 68 begins closing at 204, fully closes, and remains closed until the intake valve closes at 206.

Figure 6:
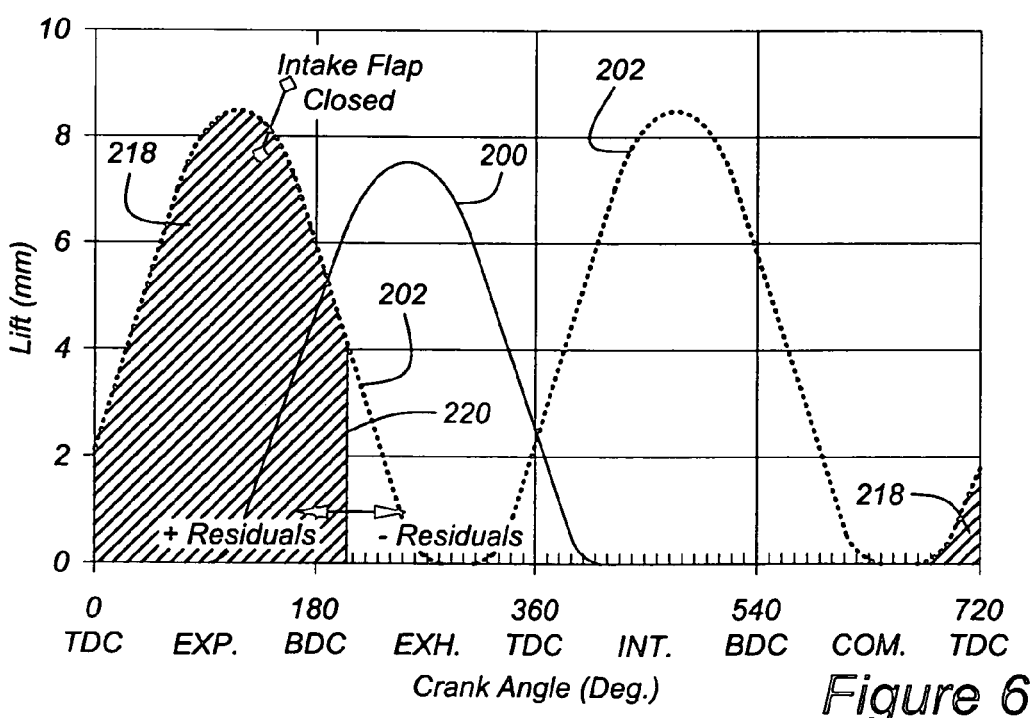

FIG. 6 shows the opening and closing displacement of intake flap 68, superimposed on displacement 200 of the exhaust valve 34, in an engine having a dual lobe cam for producing two openings and closures of the intake valves during a full engine cycle, and internal EGR. Intake flap 68 is closed during crank range 218, and opens at crank angle 220, approximately at 200°. Flap 68 opens earlier for more residual induction, or opens later for less residual induction. A dual lobe cam for actuating the intake valves 26, 28 is described with reference to FIG. 13. A similar cam can be used to actuate the exhaust valves 34, 36, if desired.

Figure 7:
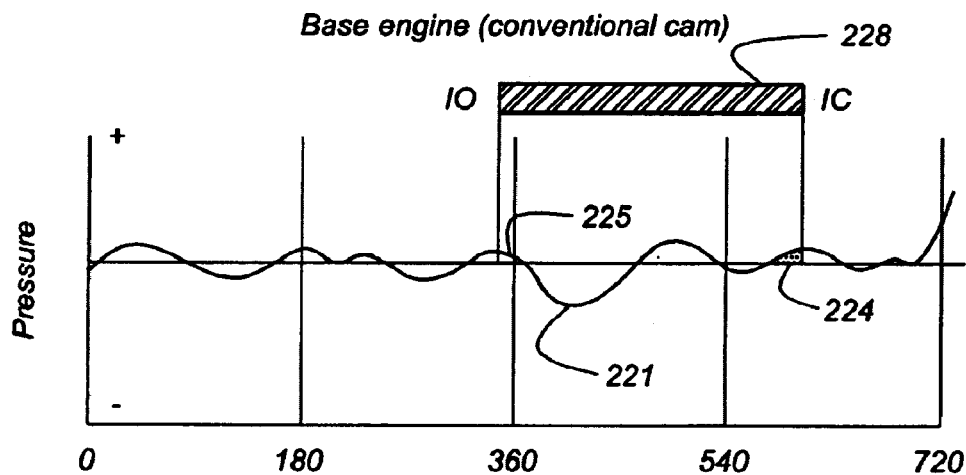
FIGS. 7 and 8 are graphs showing the variation of pressure in the intake manifold of an engine operating at low speed and high speed, respectively.
Figure 8:
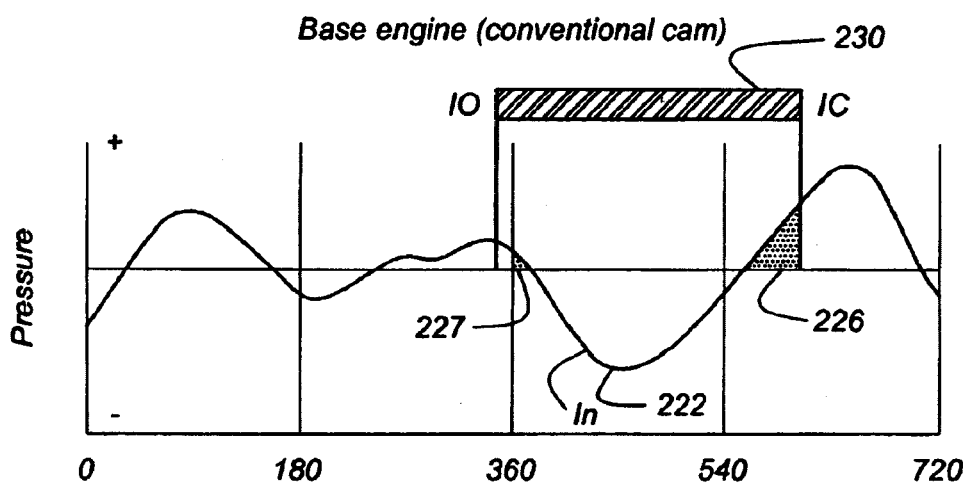

Shown in FIGS. 7 and 8 are pressure pulses in the intake manifold 84 for an engine having a conventional cam and operating at 3000 and 7000 rpm, respectively. The figures show resonant pressure pulses 220, 222 in the intake manifold 84. High pressure pulses 224, 225, 226, 227 have been captured and trapped in the cylinder 10 by controlling the intake actuator 126 to close the intake flap 68 while the engine intake valve 26 is open. The engine intake valve 26 is open during the crank angle periods 228, 230, for which IO and IC indicate intake-open and intake-close, respectively. Capture of a pressure pulse ensures maximum filling of the corresponding cylinder 10 with intake air during every engine cycle.

Similarly for scavenging, negative pressure pulses are captured and trapped in the cylinder 10 by the control system controlling the exhaust actuator 127 to close the exhaust flap 58 while the engine exhaust valve 34 is open. This closure of the exhaust flap 58 prevents exhaust gas from flowing into the exhaust manifold and cylinder from the exhaust system.

The valve events, which are controlled on the basis of engine speed, move relative to the pressure pulses, which are acoustic and vary with the speed of sound. The control system varies the opening and closing of the flaps 68, 58 due to the mismatch of the relatively fixed acoustic dependent variables and the engine speed-dependent valve events over the full range of engine speed.

Each flap is actuated synchronously in every engine cycle, and each flap is open during the period when the corresponding engine valve is open. A principal purpose of each intake and exhaust is to selectively shorten the effective time in which the corresponding engine intake and exhaust valve is open to the respective manifold. Each flap can delay the start of flow through the valve, or shorten the flow period through the valve. As the operating point of the engine approaches the point where the cams have been optimized, the flap will open for longer periods. At the operating point for which the cams are optimized, the flap can simply be left open, turning over control to the camshaft. A fixed cam would be optimized to the maximum open duration, which is the shortest closed time.

FIGS. 9, 10 and 11, which show an engine having one intake port and one exhaust port, illustrate more general applications of this invention than that shown in FIG. 1.

FIG. 9 shows the intake and exhaust system of an internal combustion engine 238, in which of an intake flap 240, located in an intake gas runner 242, is arranged in series with an engine intake valve 244. Similarly, an exhaust flap 246, located in an exhaust gas runner 248, is arranged in series with an engine exhaust valve 250. The valves and flaps are located above the engine cylinder 252, which contains a reciprocating piston 254.

Camshafts, to produce the conventional four engine strokes, control movement of the intake and exhaust valves. Preferably, the camshaft is designed to produce the longest valve opened periods, which are best suited for optimal high speed, high power engine operation. Cam timing is fixed. But the flaps 240 and 246 are controlled to open and close during each engine cycle in coordination with operation of the valves 244 and 250. For example, intake flap 240 is open at least during a portion of the period when the intake valve is open, allowing intake gas to enter the cylinder 252 through the intake runner 242. But flap 240 is closed during a portion of the period while the intake valve 244 is open in order to shorten the gas intake duration. Similarly, exhaust flap 246 is open at least during a portion of the period when the exhaust valve 250 is open, allowing exhaust gas to exit the cylinder 252 through the runner 248. But flap 246 is closed during a portion of the period while the valve 250 is open in order to shorten the exhaust period.

Flaps can be used also to enhance exhaust gas recirculation (EGR) in an IC engine, as shown in the assembly of FIG. 10, in which of an intake flap 260, located in an intake gas runner 262, is arranged in series with an engine intake valve 264. Similarly, an exhaust flap 266, located in an exhaust gas runner 268, is arranged in series with an engine intake valve 270. A source of EGR 272 communicates with the engine intake port 274 downstream of flap 260 and upstream of port 274.

Intake flap 260 closes during the engine intake stroke, producing low pressure in the runner 262 between intake port 274 and the closed flap 260. During the intake stroke when flap 260 is closed and valve 264 is opened, the rate of EGR flow from the EGR source 272 into the engine is increased due to the low pressure in the runner 262. Furthermore, displacement of the intake flap 260 can be controlled to fluctuate in order to modulate the EGR flow rate into the engine.

For a two stroke IC engine 278 having no engine intake and exhaust valves, such as that illustrated in FIG. 11, an exhaust flap 280 can be controlled during each engine cycle to prevent back flow of engine exhaust gas from the exhaust runner 282 into cylinder 252 while intake gas enters the engine through the intake runner 288. The engine includes an exhaust port 284, through which exhaust gas leaves the cylinder and enters runner 282, and an intake port 286, through which intake gas enters the cylinder 252 from the intake runner 288. The engine arrangement of FIG. 12 increases the magnitude the trapped fresh air mass in the cylinder.

Figure 12:
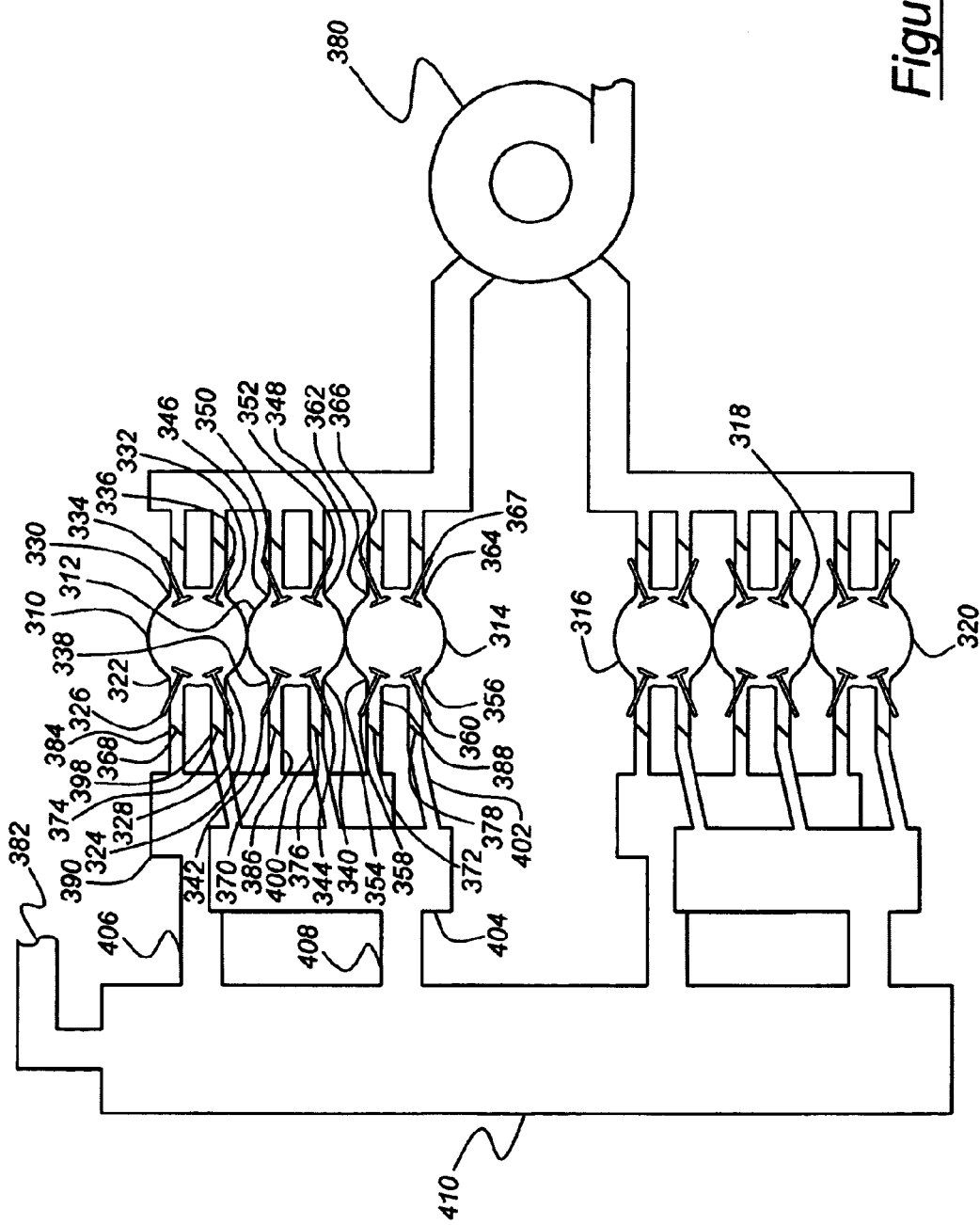
FIG. 12 is a schematic diagram of an intake and exhaust system for a pulse charged combustion engine.

In FIG. 12 there is illustrated a four-cycle, six-cylinder internal combustion engine having three cylinders 310, 312, 314 in a left-side bank and three cylinders 316, 318, 320 in a right-side bank. Each cylinder contains a reciprocating piston, and the pistons are connected to a crankshaft. The cylinders 310–320 may have a conventional spark ignition sequence, i.e., 310-318-314-320-312-316.

Each cylinder has two intake ports and two outlet ports. For example, cylinder 310 has intake ports 322, 324, which are opened and closed by intake valves 326, 328, respectively, and two outlet ports 330, 332, which are opened and closed by exhaust valves 334, 336, respectively. Camshafts to produce the conventional intake, compression, power, and exhaust strokes in each cylinder actuate the intake valves 326, 328 and exhaust valves 334, 336. Cylinder 312 has intake ports 338, 340, which are opened and closed by intake valves 342, 344, respectively, and two outlet ports 346, 348, which are opened and closed by exhaust valves 350, 352, respectively. Similarly cylinder 314 has intake ports 354, 356, which are opened and closed by intake valves 358, 360, respectively, and two outlet ports 362, 364, which are opened and closed by exhaust valves 366, 368, respectively.

An intake flap or butterfly valve, located in an intake passage in series with at least one of the intake valves of each cylinder, is supported to pivot about an axis transverse to the axis of the intake passage. For example, intake flap 368 is arranged in series with intake valve 326, intake flap 370 is arranged in series with intake valve 342, and intake flap 372 is arranged in series with intake valve 358. Similarly, an intake flap 374 may be arranged in series with intake valve 328, an intake flap 376 may be arranged in series with intake valve 344, and an intake flap 378 may be arranged in series with intake valve 360.

Each exhaust port 330, 332, 346, 348, 362, and 364 communicates with the exhaust system of the vehicle. A turbocharger 380, driven by exhaust gas exiting the exhaust ports, may be used to compress ambient air entering the engine. Preferably, air supplied to an intake manifold 382 from the turbocharger 380 is chilled before entering the manifold 382 and cylinders.

The intake ports are coupled to an intake gas resonance system for improving the process of charging of the cylinders with intake gas. The right-side and left-side cylinder banks are coupled to a resonance system. The intake ports 322, 338, 354 of cylinders 310, 312, 314 are coupled by respective intake passages 384, 386, 388 to a resonator 390. The intake ports 324, 344, 356 of cylinders 310, 312, 314 are coupled by respective intake passages 398, 400, 402 to a resonator 404. Preferably, resonators 390 and 404 are Helmholtz resonators.

A resonance tube 406 and 408 connects resonator 390 and 404 to a common equalizing plenum 410, which is supplied with intake air through intake manifold 382. A resonance tube 408 connects resonator 404 to the equalizing plenum 410.

The cyclic suction pressure in the cylinders causes oscillation of the intake gas flowing in the intake gas resonance system, and creates pressure pulses in the intake system. Resonator 390, which is coupled to intake ports 322, 338, 354 by the suction pipes 384, 386, 388, is tuned to produce at intake ports 322, 338, 354 a variable pressure that varies cyclically with time between maximum and minimum pressure amplitude. Resonator 404, which is coupled to intake ports 324, 340, 356 by the intake passages 398, 400, 402, is tuned to produce a pressure profile at the intake ports 324, 340, 356.

In operation, the engine intake valves 326, 328, 342, 344, 354, 360 operate under control of the cam shaft for each engine cylinder 310, 312, 314 in the conventional way, opening at the beginning of the intake stroke, closing at the beginning of the compression stroke, remaining closed during the expansion stroke, and opening at the beginning of the exhaust stroke. The flaps 368, 370, 372 are controlled so that each flap opens and closes at the appropriate time for each cylinder, whose cycles are out of phase with the cycles of the other cylinders. Flaps 368, 370, 372 open such that the pressure pulse from resonator 390 reaches the respective cylinder and enters the cylinder while the corresponding intake valve is open. The flaps 368, 370, 372, located in the intake passages 384, 386, 388, are controlled to open and close alternately the corresponding intake passages during each engine cycle for each engine cylinder 310, 312, 314. Each flap then closes, before the intake valve of the corresponding cylinder closes, to prevent backward flow of intake gas from the cylinders through the intake ports and intake passages to the resonator 390. When the intake valves of each cylinder close, the charge is compressed, ignited and expands in the cylinder. Engine exhaust gas exits the cylinders during the exhaust stroke of each cylinder through exhaust ports 330, 332, 346, 348, 362, 364.

Figure 13:
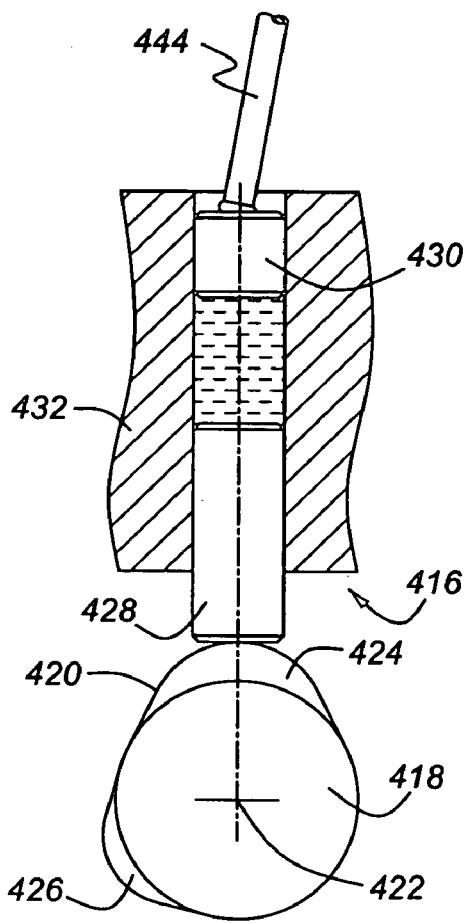
FIG. 13 is a schematic diagram of a cam actuation system that includes a dual lobe cam.

FIG. 13 is a schematic diagram of a cam actuation system 416, which includes a camshaft 418 having a dual lobe cam 420, the camshaft being supported for rotation about axis 422 and the cam being formed with an intake lobe 424 and an EGR lobe 426. As cam 420 rotates, a follower piston 428 and an upper piston 430 reciprocate in aligned cylinders formed in the engine block 432. The upper piston 430 actuates a pushrod 444, which is driveably connected to an intake valve 26. The intake valve 26 opens and closes intake port 22 twice during each revolution of the camshaft 418 in response to the angular position of cam 420 about axis 422. In the conventional way, the engine shaft drives the camshaft.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An internal combustion engine that operates on an engine cycle, comprising:
    an engine cylinder including an intake port;
    an intake manifold providing a passage through which intake gas enters the cylinder through the intake port;
    an intake valve for opening and closing the intake port; and
    a first flap located in the intake manifold upstream from the intake valve, arranged in series with the intake valve, having first and second positional states that vary during each engine cycle, the first state opening the passage to permit intake gas to enter the intake port, the second state at least partially closing the passage to limit the flow of intake gas through the intake port, wherein said first and second positional states vary with each engine cycle.

2. The engine of claim 1, further comprising:
    an exhaust port;
    an exhaust manifold providing a passage through which exhaust gas exits the cylinder through the exhaust port;
    an exhaust valve for opening and closing the exhaust port; and
    a second flap located in the exhaust manifold downstream from the exhaust valve, arranged in series with the exhaust valve, having third and fourth positional states that vary during each engine cycle, the third state opening the exhaust passage to permit exhaust gas to exit the exhaust port, the fourth state at least partially closing the exhaust passage to limit the flow of exhaust gas from exiting the exhaust port, wherein said third and fourth positional states vary with each engine cycle.

3. The engine of claim 2, further comprising:
    a cam shaft formed with a cam for operating the exhaust valve to produce two openings and closures of the exhaust valve during an engine cycle.

4. The engine of claim 1, further comprising:
    an EGR source communicating with intake passage between the first flap and the intake port, wherein the first positional state further opens the intake passage to permit intake gas and EGR gas to enter the intake port, the second state at least partially closing the intake passage to limit the flow rate of intake gas through the intake port to increase the flow rate of EGR gas through the intake port.

5. The engine of claim 1, further comprising:
    an EGR source communicating with intake passage between the first flap and the intake port;
    an exhaust port;
    an exhaust runner providing a passage through which exhaust gas exits the cylinder through the exhaust port;
    an exhaust valve for opening and closing the exhaust port;
    a second flap located in the exhaust runner downstream from the exhaust valve, arranged in series with the exhaust valve, having third and fourth positional states that vary during each engine cycle, the third state opening the exhaust runner passage to permit exhaust gas to exit the exhaust port, the fourth state at least partially closing the exhaust runner passage to limit a flow rate of exhaust gas through the exhaust port wherein said third and fourth positional states vary with each engine cycle.

6. The engine of claim 1, further comprising:
    a cam shaft formed with a cam for operating the intake valve to produce two openings and closures of the intake valve during an engine cycle.

7. An internal combustion engine that operates on an engine cycle, comprising:
    multiple engine cylinders, each cylinder including first and second intake ports;
    first intake runners providing passages through which intake gas enters the first intake port of each respective cylinder;
    second intake runners providing passages through which intake gas enters the second intake port of each respective cylinder;
    first intake valves for opening and closing the first intake port of each respective cylinder;
    second intake valves for opening and closing the second intake port of each respective cylinder;
    a plenum having an inlet through which intake gas enters the plenum, and first and second outlets through which intake gas exits the plenum;
    a first resonator communicating with the first outlet and the first intake runner of each respective cylinder and producing in the first intake runner first pressure pulses of intake gas having a varying cyclic amplitude;
    a second resonator communicating with the second outlet and with the second intake runner of each respective cylinder and producing in the second intake runner second pressure pulses of intake gas having a varying cyclic amplitude that is out of phase with the first cyclic pressure pulses; and
    first flaps, each first flap located in a first intake runner upstream from, and in series with a respective first intake valve, having first and second positional states that vary during each engine cycle, the first state opening the first intake runner passage to permit the first pressure pulses to enter the respective first intake port when an amplitude of the first pressure pulses reaches a predetermined magnitude, the second state at least partially closing the respective first intake runner passage to limit the flow rate of intake gas from the respective cylinder through the respective first intake port, wherein said first and second positional states vary synchronously with each engine cycle.

8. The engine of claim 7, wherein the first state occurs when the first intake valves open and when the first intake valves close.

9. The engine of claim 7, further comprising:
    second flaps, each second flap located in a second intake runner upstream from, and in series with a respective second intake valve, having third and fourth positional states that vary during each engine cycle, the third state opening the respective second intake runner passage to permit the second pressure pulses to enter the respective second intake port when an amplitude of the second pressure pulses reaches a predetermined magnitude, the fourth state at least partially closing the second intake runner passage to limit the flow rate of intake gas from the respective cylinder through the respective second intake port, wherein said third and fourth positional states vary synchronously with each engine cycle.

10. The engine of claim 9 wherein the fourth state closes the second intake runner passage to limit the flow rate of intake gas from the respective cylinder through the respective second intake port.

11. The engine of claim 9, wherein the third state occurs when the second intake valves open and when the second intake valves close.

12. The engine of claim 7 wherein the second state closes the respective first intake runner passage to prevent flow of intake gas from the respective cylinder through the respective first intake port.

13. The engine of claim 7, further comprising:
    first and second exhaust ports in each cylinder, through which exhaust gas exits the respective cylinder;
    first exhaust runners providing passages through which exhaust gas exits each respective cylinder through the first respective exhaust port;
    second exhaust runners providing passages through which exhaust gas exits each respective cylinder through the second respective exhaust port.

14. An internal combustion engine that operates on an engine cycle, comprising:
    an engine cylinder including an intake port and an exhaust port;
    an intake runner providing a passage through which intake gas enters the cylinder through the intake port;
    an exhaust runner providing a passage through which exhaust gas exits the cylinder through the exhaust port;
    a flap located in one of the intake runner or exhaust runner, having first and second positional states that vary during each engine cycle, the first state opening the respective runner passage, the second state at least partially closing the respective runner passage, wherein said first and second positional states vary synchronously with each engine cycle.

15. The engine of claim 14 wherein the engine is a two-stroke engine.

16. The engine of claim 14 wherein the engine is a two-stroke engine, and the flap is located in the exhaust runner passage in series with exhaust port.

17. A system for controlling an engine comprising:
    an internal combustion engine that operates on an engine cycle, the engine including a cylinder, an intake port communicating with a source of intake air, and an engine intake valve for opening and closing communication between the cylinder and the intake port;
    a flap operatively arranged in series with and located upstream from the engine intake valve;
    sensors producing signals representing operating parameters;
    a controller operatively connected to the sensors, determining with reference to an operating parameter points during the engine cycle when a future opening and a future closing of the engine intake valve will occur, opening the flap before the engine intake valve opens during the current engine cycle, and in responsive to said determination closing the flap before the engine valve closes such that a pressure pulse from the air source is retained in the cylinder, wherein said opening and closing of said engine intake valve varies synchronously with each engine cycle.

18. The system of claim 17 wherein the operating parameter is engine speed.

19. The system of claim 17 wherein the operating parameter is a measure of engine load.

20. The system of claim 17 wherein the operating parameter is a throttle position.

21. The system of claim 17 wherein the operating parameter is engine temperature.

22. The system of claim 17, further comprising:
    an exhaust port communicating with the atmosphere, and an engine exhaust valve for opening and closing communication between the cylinder and the exhaust port;
    a second flap operatively arranged in series with, and located downstream from the engine exhaust valve; and
    the controller determining points during the engine cycle when a future opening and a future closing of the engine exhaust valve will occur, and in responsive to said determination closing the second flap before the engine valve closes during the current engine cycle such that a low magnitude pressure pulse is retained in the cylinder, wherein said opening and closing of said engine exhaust valve varies synchronously with each engine cycle.

* * * * *